US008899405B2

(12) United States Patent
Ookubo

(10) Patent No.: US 8,899,405 B2
(45) Date of Patent: Dec. 2, 2014

(54) ASSEMBLY WORK CONVEYOR DEVICE

(75) Inventor: Masashi Ookubo, Iwate (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 14/127,307

(22) PCT Filed: Mar. 23, 2012

(86) PCT No.: PCT/JP2012/057461
§ 371 (c)(1),
(2), (4) Date: Dec. 18, 2013

(87) PCT Pub. No.: WO2013/008491
PCT Pub. Date: Jan. 17, 2013

(65) Prior Publication Data
US 2014/0131170 A1    May 15, 2014

(30) Foreign Application Priority Data

Jul. 13, 2011    (JP) .................................. 2011-154448

(51) Int. Cl.
| | | |
|---|---|---|
| B65G 35/06 | (2006.01) | |
| B65G 17/00 | (2006.01) | |
| B23P 19/00 | (2006.01) | |
| B23P 21/00 | (2006.01) | |
| B61B 10/04 | (2006.01) | |
| B65G 35/08 | (2006.01) | |

(52) U.S. Cl.
CPC ............... B65G 17/002 (2013.01); B23P 19/00 (2013.01); B23P 21/00 (2013.01); B61B 10/04 (2013.01); B65G 35/08 (2013.01)
USPC ................. 198/465.2; 198/867.01; 198/860.1

(58) Field of Classification Search
CPC ..... B65G 17/065; B65G 17/066; B65G 35/06
USPC ........ 198/345.1, 346.1, 465.1, 465.2, 867.01, 198/860.1
See application file for complete search history.

(56) References Cited

U.S. PATENT DOCUMENTS 4,051,969 A * 10/1977 Homanick .................... 414/679
5,526,562 A *  6/1996 Kita et al. ....................... 29/755

(Continued)

FOREIGN PATENT DOCUMENTS

| | | |
|---|---|---|
| JP | 3-190653 | 8/1991 |
| JP | 6-283057 | 10/1994 |
| JP | 9-180554 | 7/1997 |

(Continued)

OTHER PUBLICATIONS

International Search Report dated Apr. 17, 2012.

*Primary Examiner* — Leslie A Nicholson, III
*Assistant Examiner* — Keith R Campbell
(74) *Attorney, Agent, or Firm* — Greenblum & Bernstein, P.L.C.

(57) ABSTRACT

An assembly work conveyor device has a work dolly and a movement driver. The work dolly includes a moving dolly including a plurality of moving portions movable on a movement surface and being movable along an elliptical movement path, and a work board mounted on the moving dolly in a state of extending further to an inner peripheral side of the elliptical movement path than the plurality of moving portions. The movement driver moves the work dolly along the elliptical movement path. An auxiliary support surface is provided on the inner peripheral side of the elliptical movement path along at least a portion thereof. An auxiliary support is provided in the work dolly, the auxiliary support being brought into contact with the auxiliary support surface further on the inner peripheral side of the elliptical movement path than the plurality of moving portions and supporting a gravity of the work board.

7 Claims, 6 Drawing Sheets

(56) References Cited

U.S. PATENT DOCUMENTS

| | | | |
|---|---|---|---|
| 6,446,743 B2 * | 9/2002 | Suzuki | 180/168 |
| 6,502,691 B2 * | 1/2003 | Akatsuka et al. | 198/795 |
| 6,638,382 B2 * | 10/2003 | Satou | 156/64 |
| 8,646,590 B2 * | 2/2014 | Tepel | 198/343.2 |

FOREIGN PATENT DOCUMENTS

| | | |
|---|---|---|
| JP | 11-039967 | 2/1999 |
| JP | 2000-288963 | 10/2000 |
| JP | 2005-279840 | 10/2005 |
| JP | 2005-280894 | 10/2005 |

* cited by examiner

ASSEMBLY WORK CONVEYOR DEVICE

TECHNICAL FIELD

The present invention relates to an assembly work conveyor device for assembling a wire harness or the like.

BACKGROUND ART

A conventional conveyor device for wire harness assembly of this type is disclosed in Patent Literature 1.

A dolly to which a drawing board is fixated is circulated and driven by a chain along an elliptical annular path. The dolly has a guide roller projecting horizontally in a direction opposite to a side where a worker stands. The guide roller rolls on a guide rail, and thus the dolly moves horizontally in a predetermined orientation.

CITATION LIST

Patent Literature

Patent Literature 1: Japanese Patent Laid-Open Publication No. 2000-288963

SUMMARY OF INVENTION

Technical Problem

An assembly work conveyor device as above is also required to eliminate spatial waste.

In order to stably support a dolly, however, a plurality of casters that support and allow a work station to move should be provided at sufficient distances. This makes it difficult to downsize the dolly itself and reduce a space in a movement path for the dolly.

In Patent Literature 1 above, the horizontally-projecting guide roller is provided to the dolly. The guide roller rolls on the guide rail, and thus stabilizes the dolly. However, the guide roller horizontally projecting from the dolly is not sufficient to prevent the dolly from falling.

In view of the above, the present invention is intended to downsize a work dolly as well as to support the work dolly to be movable in a stable manner.

Solution to Problem

In view of the above, a first aspect provides an assembly work conveyor device including a work dolly and a movement driver. The work dolly includes a moving dolly including a plurality of moving portions movable on a movement surface and being movable along an elliptical movement path, and a work board mounted on the moving dolly in a state of extending further to an inner peripheral side of the elliptical movement path than the plurality of moving portions. The movement driver moves the work dolly along the elliptical movement path. An auxiliary support surface is provided on the inner peripheral side of the elliptical movement path along at least a portion of the elliptical movement path. An auxiliary support is provided in the work dolly, the auxiliary support being brought into contact with the auxiliary support surface further on the inner peripheral side of the elliptical movement path than the plurality of moving portions and supporting a gravity of the work board.

A second aspect provides the assembly work conveyor device according to the first aspect, in which the auxiliary support extends perpendicularly downward from the work dolly in a position further on the inner peripheral side of the elliptical movement path than the plurality of moving portions so as to be brought into contact with the auxiliary support surface.

A third aspect provides the assembly work conveyor device according to the first or second aspect, in which the auxiliary support surface is provided in at least a curved portion of the elliptical movement path.

A fourth aspect provides the assembly work conveyor device according to the third aspect, in which a horizontal guide is provided in a linear portion of the elliptical movement path, and a horizontal auxiliary guide is provided in the work dolly, the horizontal auxiliary guide extending to the inner peripheral side of the elliptical movement path and being movably brought into contact with the horizontal guide.

A fifth aspect provides the assembly work conveyor device according to one of the first to fourth aspects, in which the auxiliary support surface is provided in a portion of the elliptical movement path, and a guide surface obliquely downward to an exterior is provided in the auxiliary support surface in an end portion on a side where the auxiliary support starts to be brought into contact.

A sixth aspect provides the assembly work conveyor device according to one of the first to fifth aspects, in which a support frame stands within the elliptical movement path, the support frame standing by itself on one support pillar from a longitudinal view of the elliptical movement path.

A seventh aspect provides the assembly work conveyor device according to one of the first to sixth aspects, further including a self-standing auxiliary leg provided in the moving dolly, the self-standing auxiliary leg extending to a side where the work board extends and being capable of being provided in a state of being capable of contacting the movement surface.

Advantageous Effects of Invention

According to the assembly work conveyor device of the first aspect, the work board is mounted on the moving dolly in a state of extending further to the inner peripheral side of the elliptical movement path than the plurality of moving portions. Thus, a size of the work dolly can be reduced compared to that of the work board. Furthermore, the auxiliary support surface is provided on the inner peripheral side of the elliptical movement path along at least a portion thereof. In the work dolly, the auxiliary support is provided which is brought into contact with the auxiliary support surface further on the inner peripheral side of the elliptical movement path than the plurality of moving portions and supports the gravity of the work board. Thus, the work dolly is prevented from falling to the side where the work board extends and supports the work dolly to be movable in a stable manner.

According to the second aspect, the auxiliary support extends perpendicularly downward from the work dolly in the position further on the inner peripheral side of the elliptical movement path than the plurality of moving portions so as to be brought into contact with the auxiliary support surface. This effectively supports the gravity of the work board.

The work dolly tends to be unstable when moving in at least the curved portion of the elliptical movement path. As in the third aspect, the auxiliary support surface is thus provided in at least the curved portion of the elliptical movement path to support the work dolly to be movable in a stable manner.

According to the fourth aspect, the horizontal auxiliary guide is movably brought into contact with the horizontal guide in the linear portion of the elliptical movement path. Thus, the work dolly can be supported to be movable in a stable manner.

According to the fifth aspect, the auxiliary support can be smoothly guided to the auxiliary support surface by the guide surface.

According to the sixth aspect, the support frame stands within the elliptical movement path, the support frame standing by itself on one support pillar from the longitudinal view of the elliptical movement path. This further reduces the size of the assembly work conveyor device.

According to the seventh aspect, the work dolly can stand by itself even when the work dolly is provided in a location away from the elliptical movement path.

DESCRIPTION OF EMBODIMENTS

Figure 1:
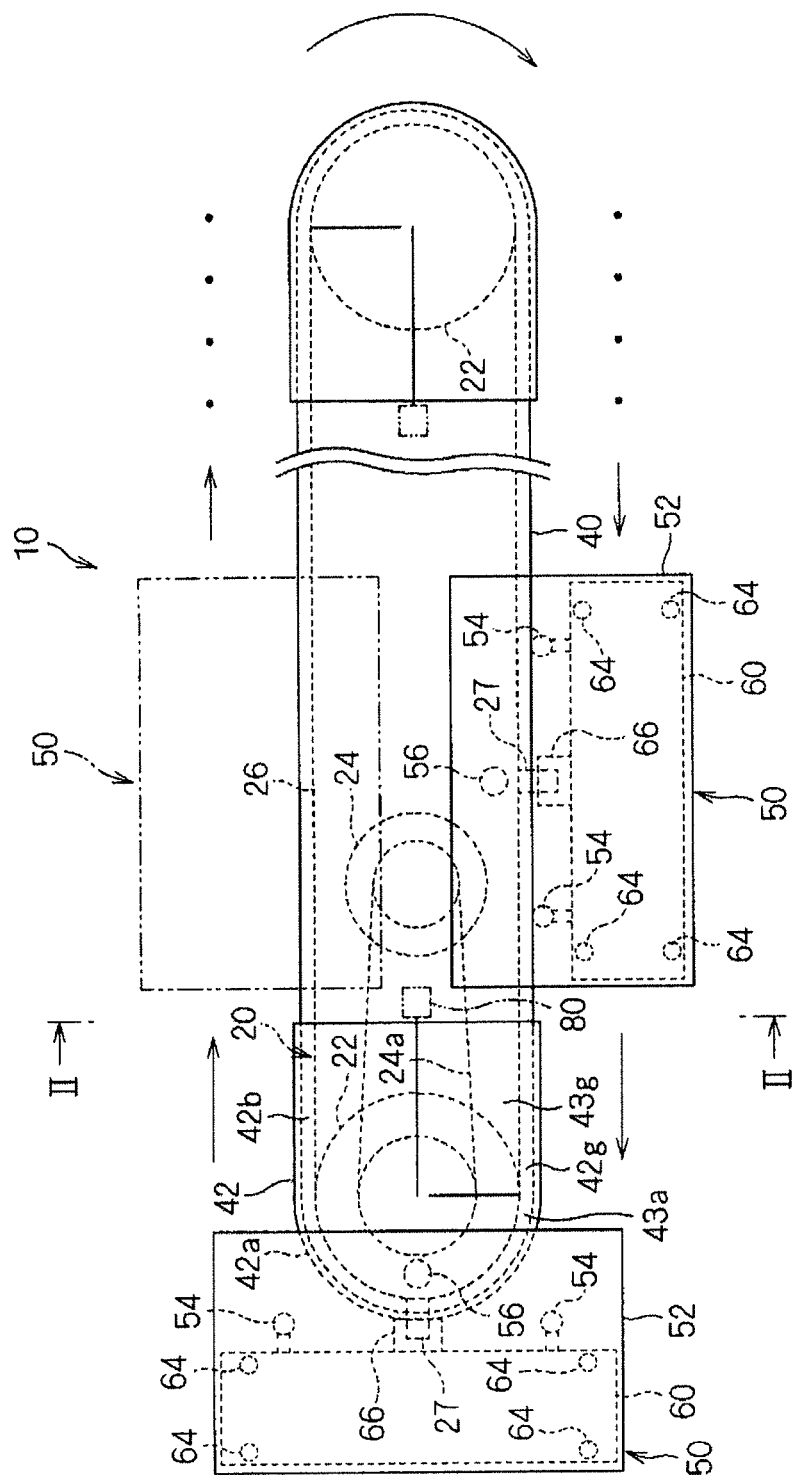
[FIG. 1] A schematic plan view of an entire configuration of an assembly work conveyor device.
Figure 2:
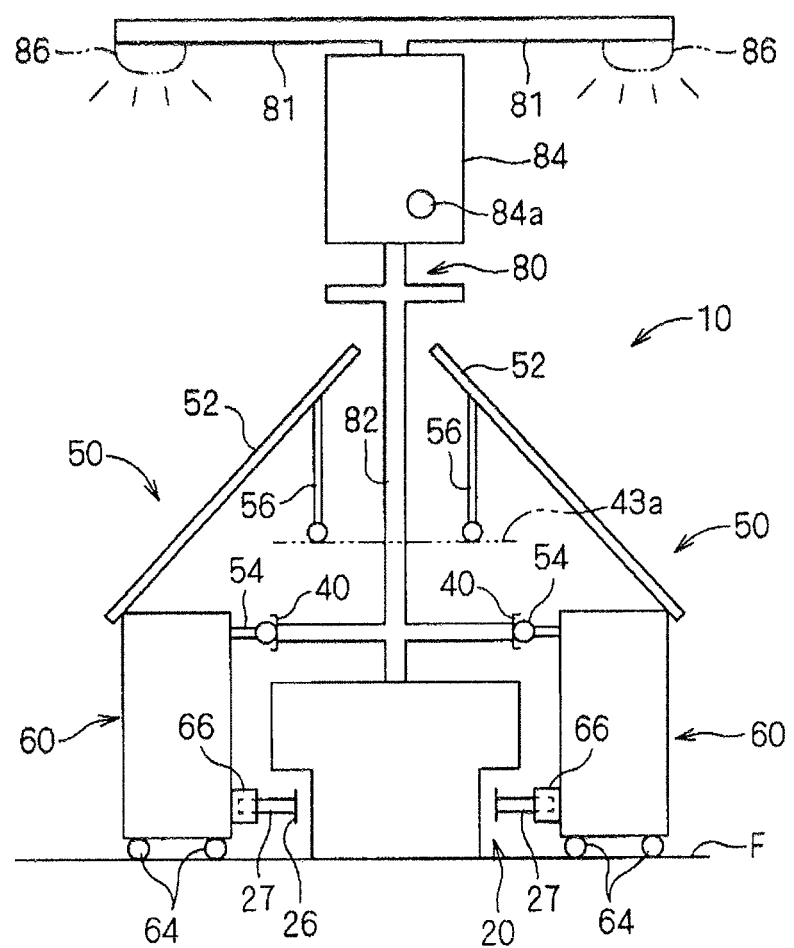
[FIG. 2] A schematic cross-sectional view along line II-II in FIG. 1.
Figure 3:
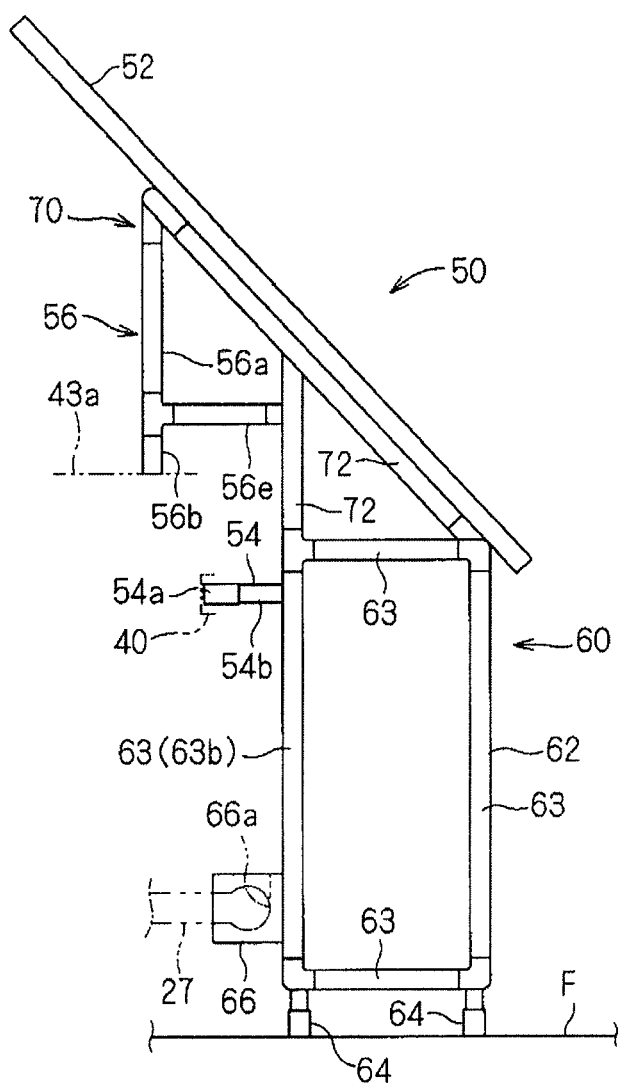
[FIG. 3] A side view of a work dolly.
Figure 4:
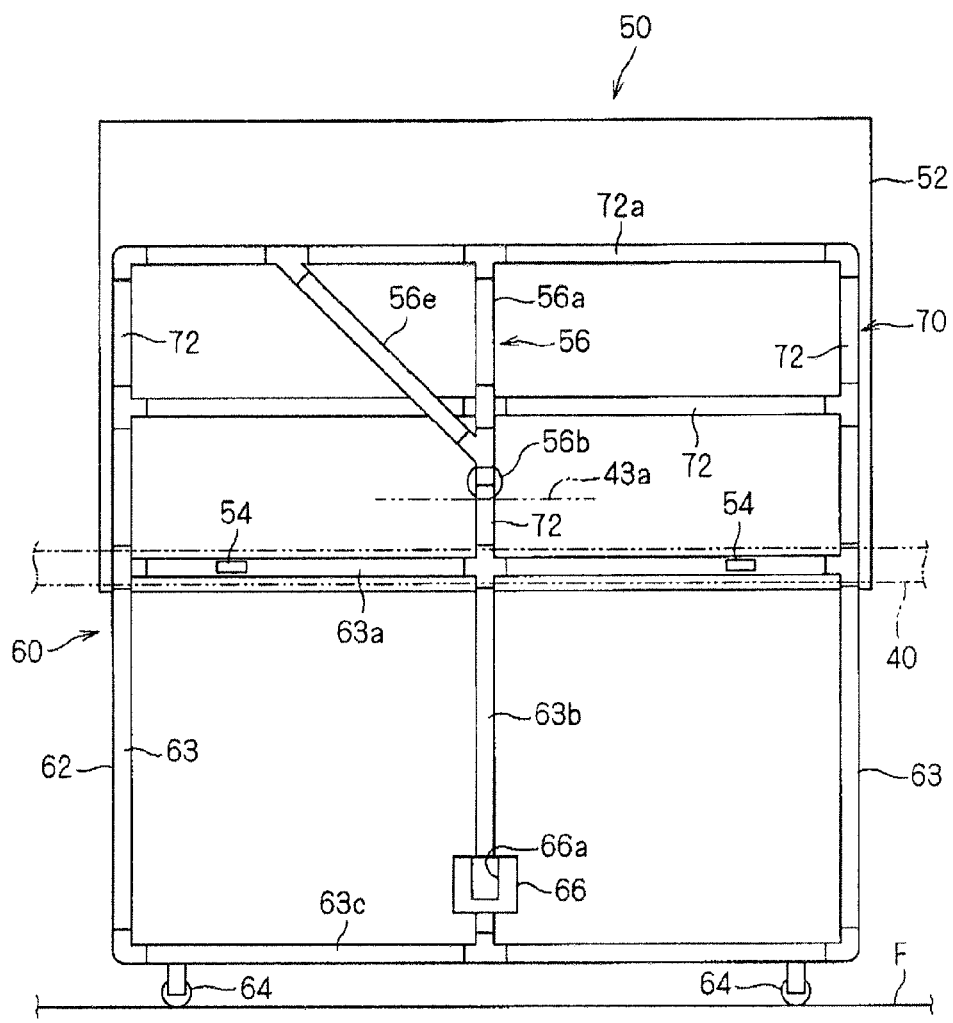
[FIG. 4] A rear view of the work dolly.
Figure 5:
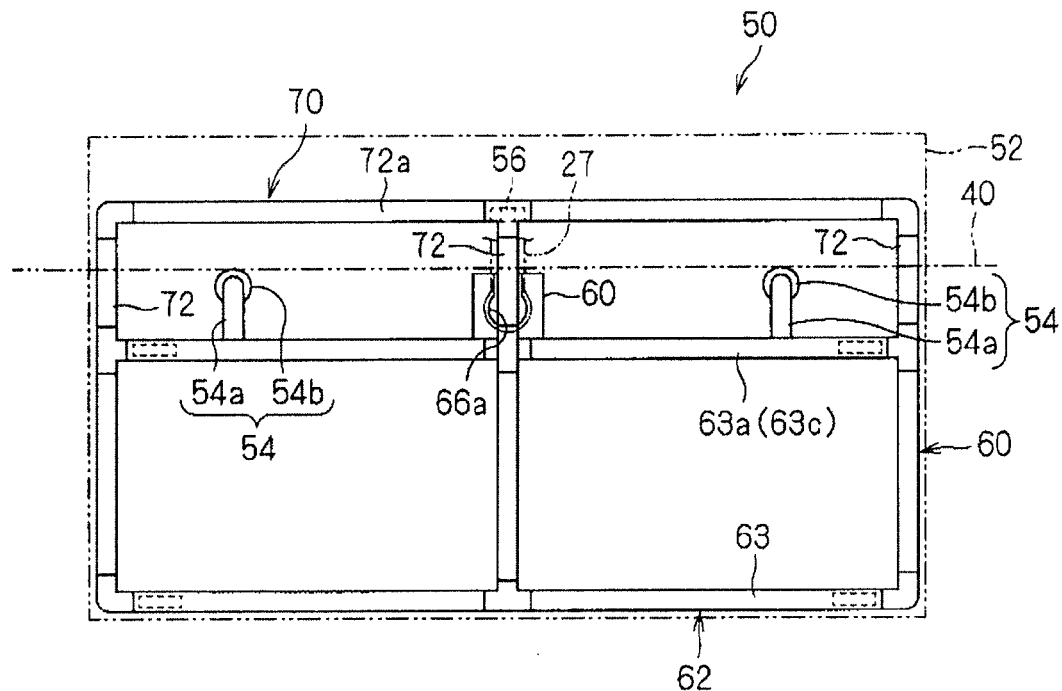
[FIG. 5] A rear view of the work dolly.

An assembly work conveyor device according to an embodiment is described below. FIG. 1 is a schematic plan view of an entire configuration of the assembly work conveyor device. FIG. 2 is a schematic cross-sectional view along line II-II in FIG. 1. FIG. 3 is a side view of a work dolly 50. FIG. 4 is a rear view of the work dolly 50. FIG. 5 is a rear view of the work dolly 50.

An assembly work conveyor device 10 has a movement driver 20 and a plurality of work dollies 50. The movement driver 20 drives the plurality of work dollies 50 to circulate and move along an elliptical movement path. In the present embodiment, the work dollies 50 are assumed to be used for assembling a wire harness mounted in a vehicle or the like. The wire harness herein includes a plurality of bundled wires, which branch out as required according to a design of a wiring path in a vehicle or the like. The wire harness is produced in a plurality of processes, including sequentially wiring a plurality of wires along a wiring path and bundling each portion. The work dollies 50 sequentially move in front of a plurality of workers, where the plurality of processes are sequentially performed, and thus the wire harness is produced. Of course, the work dollies 50 are not limited to be used for assembling the wire harness, and can be used for producing various products produced in a plurality of processes.

Each portion is described more specifically.

A moving dolly 60 is configured to be movable on a movement surface F, which is a floor surface of a plant or the like, along an elliptical movement path. More specifically, the moving dolly 60 has a moving main body 62 and a work board support 70.

The moving main body 62 is formed by assembling a rod-shaped member 63 composed of a metal or resin in a parallelepiped shape. In the present embodiment, the moving main body 62 is formed into a parallelepiped shape long in a width direction (moving direction of the elliptical movement path) and short in a depth direction (inner-outer direction of the elliptical movement path). The moving main body 62 preferably has an approximate height appropriate for a worker to work (e.g., height around the waist). The rod-shaped member 63 is built into the moving main body 62 when necessary to reinforce portions other than those corresponding to sides of the parallelepiped. In the description below, of a plurality of rod-shaped members 63, a rod-shaped member provided along a lateral direction in an upper rear portion of the moving main body 62 may be referred to as an upper lateral rod-shaped member 63a; a rod-shaped member provided along a vertical direction in an intermediate portion in the width direction of a rear portion of the moving main body 62 may be referred to as an intermediate vertical rod-shaped member 63b; and a rod-shaped member provided along the lateral direction in a lower rear portion of the moving main body 62 may be referred to as a lower lateral rod-shaped member 63c for distinction.

The moving main body 62 has a plurality of casters 64 in the lower portion as moving portions. In the present embodiment, the moving main body 62 has four casters 64 at four corners in the lower portion. The casters 64 can be multidirectionally supported wheels or rotatably supported spherical bodies. Other than the casters, the moving portions may be wheels movable on a rail provided in an elliptical shape on the movement surface F. That is, the moving portions can be configured in various ways to be movable along the elliptical movement path.

The work board support 70, which supports a work board 52 on the moving main body 62, is formed by linking and assembling a rod-shaped member 72 composed of a metal or resin. In the present embodiment, the work board support 70 is assembled in a frame shape such that a plurality of rod-shaped members 72 are provided obliquely upward from the upper front portion to the rear of the moving main body 62. More specifically, the plurality of rod-shaped members 72 include the plurality of (three herein) rod-shaped members 72 provided obliquely upward from the upper front portion to the rear of the moving main body 62 and the plurality of rod-shaped members 72 linked in the lateral direction to upper end portions of the obliquely provided plurality of rod-members 72. The rod-shaped member 72 is built into the work board support 70 when necessary to reinforce the frame shape or maintain the oblique orientation in portions other than those configuring the frame. In the description below, the rod-shaped member 72 provided in the lateral direction in the upper end portion of the work board support 70 may be referred to as a work board support lateral rod-shaped member 72a.

In the present embodiment, the moving dolly 60 is formed by assembling the rod-shaped members. However, this is not necessarily required. A board member, a housing member, or the like may be used partially or entirely.

The work board 52 is provided for assembling a wire harness. Support tools project on the work board 52 along a wiring path of a wire harness to support the wire harness. The support tools may include a tool having a U-shaped portion in an upper end portion, a tool having an L shape or I shape for positioning, and the like.

The work board 52 has a depth sufficiently greater than a depth of the work dolly 50 in the depth direction of the work dolly 50. In a state where an upper end portion of the work board 52 extends to an inner side of the moving dolly 60 (inner peripheral side of the elliptical movement path), the work board 52 is fixated to an upward portion of the work board support 70. In this state, the upper end portion of the work board 52 extends further to the inner peripheral side of the elliptical movement path than the caster 64 positioned innermost on the inner peripheral side of the elliptical movement path. The work board support 70 and the work board 52 can be fixated by using a screw, a fitting, or a bracket.

The plurality of work dollies 50 circulate and move along the elliptical movement path in an orientation where the upper end portion of the obliquely provided work board 52 is directed to the inner peripheral side.

The movement driver 20 is configured to move and drive the plurality of work dollies 50 along the elliptical movement path.

Specifically, the movement driver 20 has a pair of rotating bodies (sprockets or the like) 22 in two end portions of the elliptical movement path, a motor 24 rotating and driving one of the rotating bodies 22, and a chain 26 wound around the pair of rotating bodies 22. Rotating and driving force of the motor 24 is transmitted to the one of the rotating bodies 22 through a drive chain 24a. Then, the rotation and drive of the motor 24 rotates and drives the one of the rotating bodies 22. Thus, the chain 26 circulates and rotates along the elliptical movement path. Dolly links 27 project from the chain 26 at intervals. The dolly link 27 is a rod-shaped member having a spherically bulging front end portion (refer to FIGS. 3 and 5) and is linked to the chain 26 in an orientation projecting from the chain 26 to an outer peripheral side of the elliptical movement path.

Furthermore, the intermediate vertical rod-shaped member 63b of the moving dolly 60 has a link receiver 66 linkable to the dolly link 27. The link receiver 66 is a block-shaped member projecting from the intermediate vertical rod-shaped member 63b to a rear surface side thereof (inner peripheral side of the elliptical movement path). The link receiver 66 has a link recess 66a open upward and rearward (inner peripheral side of the elliptical movement path). The link recess 66a has a plan view shape corresponding to a plan view shape of the dolly link 27. Specifically, the link recess 66a has a shape widening toward the moving dolly 60 and narrowing toward the rearward opening (inner peripheral side of the elliptical movement path). Thus, fitting the dolly link 27 into the link recess 66a along the vertical direction links the dolly link 27 to the link receiver 66 in a lock state. In this state, circulating and rotating the chain 26 along the elliptical movement path moves the work dolly 50, which is linked to the chain 26 by the dolly link 27 and the link receiver 66, along the elliptical movement path. Moving the dolly link 27 vertically relative to the link receiver 66 in this state disengages the dolly link 27 from the link recess 66a. Thereby, the dolly link 27 is detachably and attachably linked to the link receiver 66.

In the state where the work dolly 50 is linked to the chain 26, the upper end portion of the work board 52 is provided above the movement driver 20, more specifically, above a moving path of the chain 26. Thus, an entire installation space can be reduced by placing the moving path of the work board 52 and an installation space of the movement driver 20 in an overlapping manner from a plan view. However, the work dolly 50 is unstable since the upper end portion of the work board 52 projects further to the inner peripheral side of the elliptical movement path than the moving dolly 60. More specifically, the work dolly 50 is unstable in a direction falling to the inner peripheral side of the elliptical movement path.

The assembly work conveyor device 10 therefore incorporates a mechanism horizontally supporting the work dolly 50 and a mechanism perpendicularly supporting the work dolly 50.

The mechanism horizontally supporting the work dolly 50 is first described.

Specifically, a horizontal guide 40 is provided on the inner peripheral side of the elliptical movement path. In the present embodiment, the horizontal guide 40 is provided entirely along the elliptical movement path and has a surface directed to the outer peripheral side of the elliptical movement path. The horizontal guide 40 may be provided only in a linear portion of the elliptical movement path.

Furthermore, the work dolly 50 has a horizontal auxiliary guide 54 extending to the inner peripheral side of the elliptical movement path. More specifically, the horizontal auxiliary guide 54 is provided proximate to each of two end portions of the upper lateral rod-shaped member 63a of the moving dolly 60. The horizontal auxiliary guide 54 has a horizontal support 54a and a roller 54b, the horizontal support 54a extending from the upper lateral rod-shaped member 63a to the inner peripheral side of the elliptical movement path, the roller 54b being supported to be rotatable in a front end portion of the horizontal support 54a. In the state where the work dolly 50 is linked to the chain 26, the roller 54b is pressed against the outer surface of the horizontal guide 40. In this state, when the work dolly 50 moves along the elliptical movement path, the roller 54b pressed against the outer surface of the horizontal guide 40 is driven to rotate. Thus, the work dolly 50 is supported from the inner peripheral side of the elliptical movement path.

In the mechanism above that horizontally supports the work dolly 50, however, the horizontal auxiliary guide 54 disengages from the horizontal guide 40 when the work dolly 50 moves in a curved portion of the elliptical movement path. Thus, the work dolly 50 cannot be supported from the inner peripheral side of the elliptical movement path when the work dolly 50 moves in the curved portion of the elliptical movement path.

Figure 6:
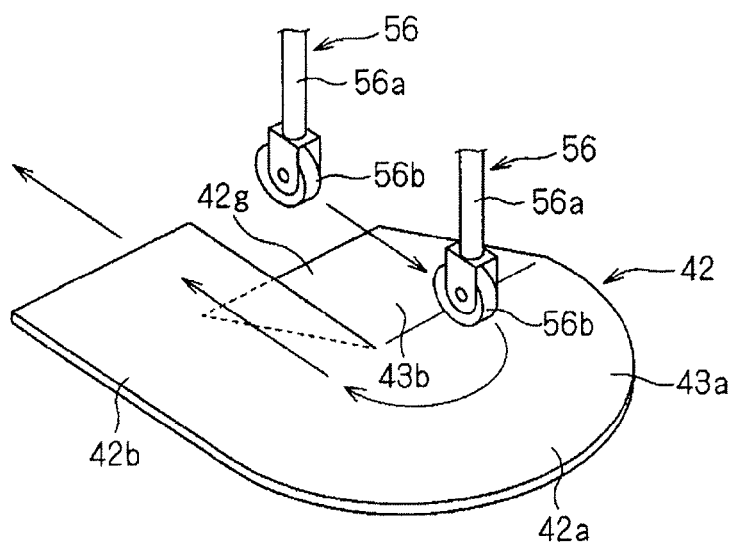
[FIG. 6] A view illustrating an auxiliary receiver and an auxiliary support.

The assembly work conveyor device 10 therefore incorporates the mechanism perpendicularly supporting the work dolly 50 in the curved portion of the elliptical movement path. FIG. 6 illustrates an auxiliary receiver 42 and an auxiliary support 56. The mechanism perpendicularly supporting the work dolly 50 is described with reference to FIGS. 1 to 6.

Specifically, the auxiliary receiver 42 is provided on the inner peripheral side of a semicircular curved portion on each of two end portions of the elliptical movement path. The auxiliary receiver 42 is also located above the movement driver 20 from a plan view. The auxiliary receiver 42, which is a member composed of a metal plate or the like, has a semi-disk portion 42a, an extending portion 42b, and a guide portion 42g. The extending portion 42b extends from a first radial portion of the semi-disk portion 42a. The guide portion 42g extends from a second radial portion of the semi-disk portion 42a. In a state where the semi-disk portion 42a and the extending portion 42b are provided horizontally, the auxiliary receiver 42 is fixated by a bracket or the like to the inner peripheral side of the semicircular curved portion on each of the two end portions of the elliptical movement path. The guide portion 42g is obliquely downward to an exterior relative to the semi-disk portion 42a and the extending portion 42b. Upward surfaces of the semi-disk portion 42a and the extending portion 42b are used as an auxiliary support surface 43a located on the inner peripheral side of the elliptical movement path along the curved portion of the elliptical movement path. An upward surface of the guide portion 42g is provided in an entry portion of the curved portion, which is a portion of the elliptical movement path, and is used as a guide surface 43g obliquely downward to the exterior (direction reverse to a moving direction of the work dolly 50).

In addition, the work dolly 50 has the auxiliary support 56 brought into contact with the auxiliary support surface 43a further on the inner peripheral side than the caster 64 provided innermost on the elliptical movement path among the plurality of casters 64 to support the gravity of the work board 52.

More specifically, the auxiliary support 56 extends perpendicularly downward from a longitudinal central portion of the work board support lateral rod-shaped member 72a (position herein same as a position where the work dolly 50 is linked to the chain 26 (position of the link receiver 66)). The work board support lateral rod-shaped member 72a is provided further on the inner peripheral side than the caster 64 provided innermost on the elliptical movement path among the plurality of casters 64. The auxiliary support 56 has an auxiliary support rod 56a and a roller 56b, the auxiliary support rod 56a hanging from the work board support lateral rod-shaped member 72a, the roller 56b being rotatably supported to a lower end portion of the auxiliary support rod 56a. The roller 56b can be brought into contact with the auxiliary support surface 43a at upper and lower positions. In the present embodiment, the auxiliary support 56 is also supported by another reinforcing rod-shaped member 56e, which may be omitted.

Thus, when the auxiliary support 56 moves along the elliptical movement path and moves from the linear portion to the curved portion, the roller 56b is guided by the guide surface 43g and is driven on the auxiliary support surface 43a (refer to FIG. 6) since the guide surface 43g is provided in an end portion of the auxiliary support surface 43a where the auxiliary support 56 starts to be brought into contact. In this state, the work dolly 50 moves along the curved portion of the elliptical movement path, and then the roller 56b moves along a curved trajectory on the auxiliary support surface 43a. After the work dolly 50 leaves the curved portion and the short linear portion thereafter of the elliptical movement path, the roller 56b is disengaged from the auxiliary support surface 43a and is suspended, and then moves on the linear portion. When the work dolly 50 moves in the curved portion, the auxiliary support 56 comes into contact with the auxiliary support surface 43a, and thereby a weight of a portion of the work board 52 is supported, the portion projecting further to the inner peripheral side of the elliptical movement path than the casters 64. This prevents the work dolly 50 from falling on the inner peripheral side in the curved portion of the elliptical movement path.

In the assembly work conveyor device 10, a support frame 80 stands by itself on one support pillar 82 within the elliptical movement path from a longitudinal view thereof. In the longitudinal direction of the elliptical movement path, a plurality of support pillars 82 may stand. Furthermore, the plurality of support pillars 82 standing in the longitudinal direction of the elliptical movement path may be linked by a horizontal frame or the like. In addition, a horizontally projecting frame may be provided in an upper portion of the support pillar(s) 82.

In the present embodiment, a frame 81 extending in two lateral directions projects from an upper end portion of the support pillar 82 from the longitudinal view of the elliptical movement path. An operation panel 84 is attached and fixated to the support frame 80, the operation panel 84 incorporating a power switch 84a and the like of the assembly work conveyor device 10. The operation panel 84 is preferably positioned higher than the work dolly 50 to prevent interference with the work dolly 50. Furthermore, a lighting device 86 is attached to the frame 81 of the support frame 80. That is, the support frame 80 has a device for operating and controlling the assembly work conveyor device 10, a device associated with assembly work, and the like.

In the present embodiment, there is a case where the work dolly 50 is removed from the chain 26, as described above. In this case, a configuration below is incorporated to allow the work dolly 50 to stand by itself.

Figure 7:
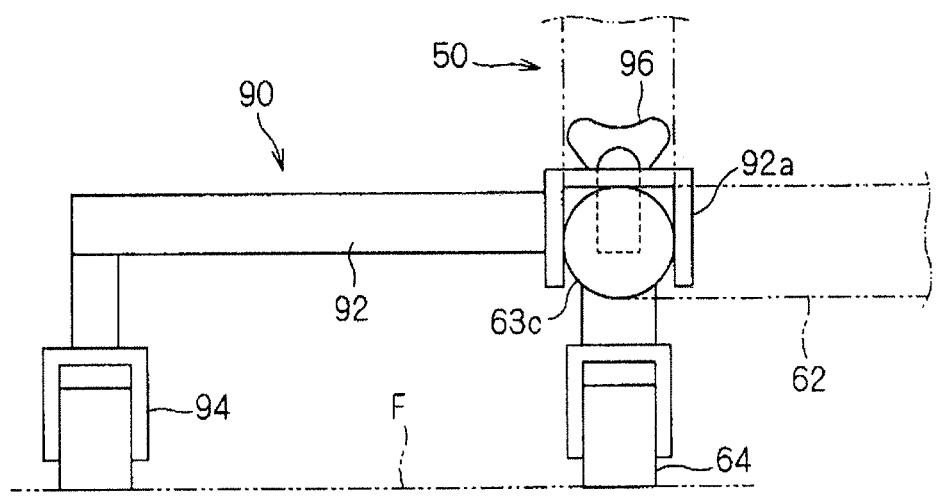
[FIG. 7] A view illustrating a configuration to allow the work dolly to stand by itself.

FIG. 7 illustrates a configuration to allow the work dolly 50 to stand by itself.

Specifically, a self-standing auxiliary leg 90 is detachably and attachably attached to the lower lateral rod-shaped member 63c of the moving dolly 60. More specifically, the self-standing auxiliary leg 90 has a horizontally extending portion 92 and a caster 94. A U-shaped portion 92a externally fittable to the lower lateral rod-shaped member 63c is attached to a first end portion of the horizontally extending portion 92. In a state where the U-shaped portion 92a is covered from above and attached to the lower lateral rod-shaped member 63c, a screw member 96, such as a wing screw or the like, is screwed and fastened to the U-shaped portion 92a and the lower lateral rod-shaped member 63c. Thereby, the U-shaped portion 92a is attached to the lower lateral rod-shaped member 63c at a predetermined position and orientation. In the state where the U-shaped portion 92a is attached as above, the horizontally extending portion 92 extends horizontally to an exterior of the moving dolly 60 (direction in which the work board 52 extends). The caster 94 is attached to a second end portion of the horizontal extending portion 92. In the attachment state above, the caster 94 is brought into contact with the movement surface F with which the casters 64 of the moving dolly 60 are in contact, and thus is movable on the movement surface F. The self-standing auxiliary leg 90 supports the work dolly 50 on a side where the work board 52 extends, and thus prevents the work dolly 50 from falling. To link the work dolly 50 with the chain 26, the self-standing auxiliary leg 90 is removed to prevent interference with the movement driver 20 and the like.

According to the assembly work conveyor device 10 configured as above, the work board 52 is mounted on the moving dolly 60 in a state of extending further to the inner peripheral side of the elliptical movement path than the casters 64. Thus, the size of the work dolly 50 can be reduced compared to that of the work board 52. In addition, the portion of the work board 52 extending therefrom can be provided above the movement driver 20 or the like which is provided within the elliptical movement path. Thus, the entire configuration of the assembly work conveyor device 10 can be downsized. For example, an installation area can be reduced by 40% compared to a conventional device.

In at least a portion of the elliptical movement path, the auxiliary support surface 43a is provided and the auxiliary support 56 is provided which is brought into contact with the auxiliary support surface 43a further on the inner peripheral side of the elliptical movement path than the casters 64 to support the gravity of the work board 52. This prevents the work dolly 50 from falling to the side where the work board 52 extends, and supports the work dolly 50 to be movable in a stable manner.

The auxiliary support 56 extends perpendicularly downward from the work dolly 50 and is brought into contact with the auxiliary support surface 43a. This effectively supports the gravity of the work board 52.

Furthermore, the auxiliary support 56 and the auxiliary support surface 43a are not brought into contact in the horizontal direction, but in a direction to support the gravity (perpendicular direction herein), thus effectively preventing the work dolly 50 from falling.

The work board 52 tends to be unstable when moving in the curved portion of the elliptical movement path. Thus, the auxiliary support surface 43a is provided along at least the curved portion of the elliptical movement path to support the work dolly 50 to be movable in a stable manner.

In the example of the embodiment above, the roller 54*b* is provided in the front end portion of the auxiliary support 56. However, a spherical body may be rotatably supported in the front end portion of the auxiliary support. Alternatively, the front end portion of the auxiliary support and the auxiliary support surface may be brought into slidable contact.

Furthermore, the auxiliary support 56 may be provided in the work board 52. The base end portion of the auxiliary support 56 does not necessarily need to be provided on the inner peripheral side of the elliptical movement path relative to the casters 64. The auxiliary support 56 does not need to be provided perpendicularly, and may be provided obliquely.

The auxiliary support 56 is preferably provided in the same position where the work dolly 50 is linked to the chain 26 in the width direction of the work dolly 50. However, this is not required.

According to the present embodiment, the horizontal auxiliary guide 54 is in contact with the horizontal guide 40 in the linear portion of the elliptical movement path. This stably supports the work dolly 50.

In particular, external force is likely to be exerted in the linear portion due to work performed by a worker. In the present embodiment, a plurality of horizontal auxiliary guides 54 are in contact with the horizontal guide 40. Thus, the work dolly 50 can be supported to be movable in a stable manner in the linear portion where external force is likely to be exerted by a worker.

Of course, a position of the auxiliary support surface 43*a* on the elliptical movement path is not limited to the example above. Furthermore, a configuration is not required in which the horizontal auxiliary guide 54 is in contact with the horizontal guide 40. For example, the horizontal auxiliary guide 54 and the horizontal guide 40 may be omitted; an auxiliary support surface may be provided along the longitudinal direction of the entire elliptical movement path; and the auxiliary support 56 may be in contact with the auxiliary support surface on the entire elliptical movement path.

In the case where the auxiliary support surface 43*a* is partially provided along the elliptical movement path as above, the guide surface 43*g* obliquely downward to the exterior can be provided in the auxiliary support surface 43*a* in the end portion on the side where the auxiliary support 56 starts to be brought into contact such that the auxiliary support 56 is smoothly guided to be brought into contact with the auxiliary support surface 43*a*.

In addition, the support frame 80 that stands by itself on one support pillar 82 from the longitudinal view of the elliptical movement path stands therewithin. Thus, the work board 52 and the support frame 80 are unlikely to interfere with each other even when the work board 52 is provided on the inner peripheral side of the elliptical movement path. Accordingly, a distance between a pair of linear portions of the elliptical movement path can be narrowed as much as possible, thus contributing to a reduction in size of the entire configuration of the assembly work conveyor device 10.

Furthermore, the moving dolly 60 has the self-standing auxiliary leg 90 that extends to the side where the work board 52 extends and is provided in a state of being capable of contacting the movement surface F. Thus, even when the work dolly 50 is disengaged from the chain 26, the work dolly 50 can stand by itself. This facilitates processing of the work board 52 for the work dolly 50.

In the example of the present embodiment, the self-standing auxiliary leg 90 is attachable to and detachable from the moving dolly 60. However, this is not necessarily required. The self-standing auxiliary leg may be linked to the moving dolly 60 by a hinge or the like and be projectable to and retractable from the moving dolly 60. Furthermore, the self-standing auxiliary leg 90 does not necessarily need to have the caster 94. The self-standing auxiliary leg may be in contact with the movement surface F so as not to be capable of moving.

Each configuration described in the embodiment and each modification can be combined appropriately as long as consistency is maintained with one another.

The detailed description above of the present invention is presented merely as an example in all aspects and should not limit the present invention. Innumerable modifications not presented are construed to be assumed without deviating from the scope of the present invention.

The invention claimed is:

1. An assembly work conveyor device comprising:
   a work dolly comprising:
      a moving dolly comprising:
         a plurality of moving portions movable on a movement surface,
      the moving dolly being movable along an elliptical movement path; and
      a work board mounted on the moving dolly in a condition extending further to an inner peripheral side of the elliptical movement path than the plurality of moving portions; and
   a movement driver moving the work dolly along the elliptical movement path, wherein
   an auxiliary support surface is provided on the inner peripheral side of the elliptical movement path along at least a portion of the elliptical movement path, and
   an auxiliary support is provided in the work dolly, the auxiliary support being brought into contact with the auxiliary support surface further on the inner peripheral side of the elliptical movement path than the plurality of moving portions and supporting a weight of the work board.

2. The assembly work conveyor device according to claim 1, wherein the auxiliary support extends perpendicularly downward from the work dolly in a position further on the inner peripheral side of the elliptical movement path than the plurality of moving portions so as to be brought into contact with the auxiliary support surface.

3. The assembly work conveyor device according to claim 1, wherein the auxiliary support surface is provided in at least a curved portion of the elliptical movement path.

4. The assembly work conveyor device according to claim 3, wherein
   a horizontal guide is provided in a linear portion of the elliptical movement path, and
   a horizontal auxiliary guide is provided in the work dolly, the horizontal auxiliary guide extending to the inner peripheral side of the elliptical movement path and being movably brought into contact with the horizontal guide.

5. The assembly work conveyor device according to claim 1, wherein
   the auxiliary support surface is provided in a portion of the elliptical movement path, and
   a guide surface obliquely downward to an exterior is provided in the auxiliary support surface in an end portion on a side where the auxiliary support starts to be brought into contact.

6. The assembly work conveyor device according to claim 1, wherein a support frame stands within the elliptical movement path, the support frame standing alone on one support pillar from a longitudinal view of the elliptical movement path.

7. The assembly work conveyor device according to claim 1, further comprising:
a self-standing auxiliary leg provided in the moving dolly, the self-standing auxiliary leg extending to a side where the work board extends and configured to be provided in a condition contacting the movement surface.

* * * * *